United States Patent
Hideg

(10) Patent No.: US 9,067,274 B2
(45) Date of Patent: Jun. 30, 2015

(54) METHOD AND SYSTEM FOR SCHEDULING WELD EVENTS

(75) Inventor: Laszlo M. Hideg, Sterling Heights, MI (US)

(73) Assignee: FCA US LLC, Auburn Hills, MI (US)

(*) Notice: Subject to any disclaimer, the term of this patent is extended or adjusted under 35 U.S.C. 154(b) by 466 days.

(21) Appl. No.: 13/453,430

(22) Filed: Apr. 23, 2012

(65) Prior Publication Data

US 2013/0282182 A1 Oct. 24, 2013

(51) Int. Cl.

| | |
|---|---|
| G05B 13/00 | (2006.01) |
| G05B 15/00 | (2006.01) |
| G05D 23/00 | (2006.01) |
| B23K 9/10 | (2006.01) |
| B23K 9/12 | (2006.01) |
| B23K 11/00 | (2006.01) |
| B23K 31/02 | (2006.01) |
| G05B 19/418 | (2006.01) |
| G06Q 10/06 | (2012.01) |

(52) U.S. Cl.
CPC .............. *B23K 11/002* (2013.01); *B23K 31/02* (2013.01); *G05B 19/41865* (2013.01); *B23K 2201/006* (2013.01); *G05B 2219/32258* (2013.01); *G06Q 10/06* (2013.01)

(58) Field of Classification Search
CPC ................ B23K 11/002; B23K 31/02; B23K 2201/006; G05B 19/41865; G05B 2219/32258; G06Q 10/06
USPC .......... 700/275, 296, 297; 219/130.21, 130.01
See application file for complete search history.

(56) References Cited

U.S. PATENT DOCUMENTS

| | | | |
|---|---|---|---|
| 4,456,810 A | 6/1984 | Schumacher et al. | |
| 4,861,960 A | 8/1989 | Haefner et al. | |
| 6,087,613 A | 7/2000 | Buda et al. | |
| 6,750,418 B1 | 6/2004 | Nastasi, Jr. | |
| 2005/0035105 A1* | 2/2005 | Spear et al. | 219/130.5 |
| 2005/0258154 A1 | 11/2005 | Blankenship et al. | |

(Continued)

FOREIGN PATENT DOCUMENTS

| | | |
|---|---|---|
| JP | H08141960 A | 6/1996 |
| JP | 2005284508 A | 10/2005 |

OTHER PUBLICATIONS

International Search Report dated Aug. 8, 2013 for International Application No. PCT/US2013/035903, International Filing Date Apr. 10, 2013.

(Continued)

*Primary Examiner* — Kenneth Lo
*Assistant Examiner* — Jason Lin
(74) *Attorney, Agent, or Firm* — Ralph E Smith

(57) ABSTRACT

A method and system for optimizing a weld schedule is disclosed. The weld schedule is used to control a plurality of welding apparatuses, and includes a plurality of weld sequences for control the plurality of welding apparatuses. The weld sequences each define one or more weld events. Each of the weld events defines a weld operation and a duration of the weld operation. The weld schedule is analyzed to determine if any time points in the weld schedule have two or more weld events scheduled where the aggregate current demand exceeds a maximum current threshold. If such a conflict in the weld schedule is identified, the weld schedule is modified by rescheduling a lower priority weld event. The method executes iteratively until all conflicts in the welding schedule are resolved.

20 Claims, 7 Drawing Sheets

(56) References Cited

U.S. PATENT DOCUMENTS

| | | |
|---|---|---|
| 2006/0190131 A1 | 8/2006 | Menassa et al. |
| 2006/0231538 A1 | 10/2006 | Rice et al. |
| 2007/0043622 A1 | 2/2007 | Olsen et al. |
| 2007/0119823 A1* | 5/2007 | Filev et al. ............ 219/110 |
| 2007/0181547 A1 | 8/2007 | Vogel et al. |
| 2008/0149686 A1 | 6/2008 | Daniel et al. |
| 2011/0180522 A1* | 7/2011 | Bunker et al. ........ 219/130.21 |
| 2011/0251731 A1* | 10/2011 | Yang et al. .............. 700/296 |
| 2011/0309062 A1* | 12/2011 | O'Donnell et al. ...... 219/130.1 |
| 2013/0116849 A1* | 5/2013 | Kooken et al. ........... 700/297 |

OTHER PUBLICATIONS

Written Opinion dated Aug. 8, 2013 for International Application No. PCT/US2013/035903, International Filing Date Apr. 10, 2013.

* cited by examiner

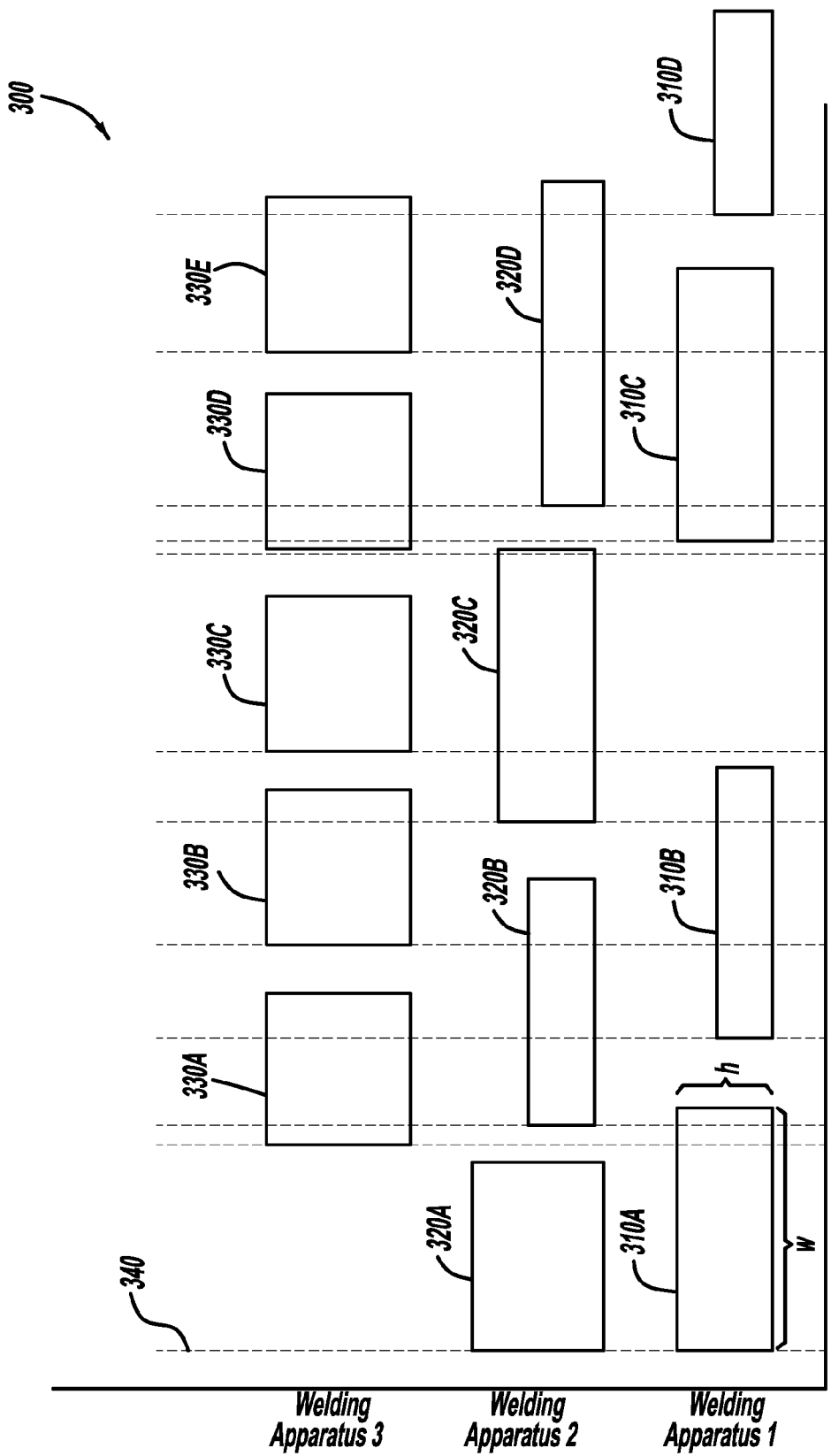

_(19) United States_

METHOD AND SYSTEM FOR SCHEDULING WELD EVENTS

FIELD

The present disclosure relates to a method and system for scheduling weld events.

BACKGROUND

In large scale manufacturing processes, e.g., automobile manufacturing, welding operations are typically performed by robotic welding systems. A robotic welding system may have two or more welding apparatuses that perform welding operations on one or more pieces of material, e.g., metal. By way of example and not of limitation, the welding apparatuses may include resistance welding guns and the robotic welding system thus may have two or more resistance welding guns. The robotic welding apparatus may correspond to a welding station in a manufacturing facility. The welding apparatuses can be robotically controlled to move to different areas to perform subsequent welding operations. Each particular welding operation can require a different current draw to perform a particular welding operation. For instance, a small gauge weld on a single work piece may require a lesser current draw than a seam weld on a plurality of work pieces or larger gauge work.

Welding apparatuses such as resistance welding guns present large inductive loads when they are energized, which are reflected back to the power bus to which the welding apparatuses are coupled, thereby reducing power factor. To compensate, capacitor banks may be provided for power factor correction. Also an issue that may arise when more than one welding apparatus is performing a welding operation at a given time is that the amount of current being drawn by the welding apparatuses at that given time may exceed a maximum amount of instantaneous current that can be efficiently provided. The capacitor banks may then supply additional current in these situations. Capacitor banks, however, are expensive to purchase and maintain. Further, capacitor banks require a significant amount of floor space in a factory.

SUMMARY

In one aspect of the disclosure, a system for optimizing a weld schedule comprises N welding apparatuses configured to perform welding operations, where N is an integer greater than 1, a weld schedule optimization module, and a weld control module. The weld schedule optimization module is configured to: i) receive the weld schedule from a weld schedule source, the weld schedule defining N different weld sequences, each weld sequence defining one or more weld events to be performed by a corresponding welding apparatus of the N welding apparatuses, each one of the weld events defining a weld operation and a duration of the weld operation. The weld schedule optimization module is further configured to ii) for each one of the weld events, determine an amount of electrical current required to perform the weld operation defined by the one weld event, and iii) determine, at a time point in the weld schedule, a total amount of electrical current required by the N welding apparatuses based on the amounts of electrical current required by the weld events that are scheduled to be performed at the time point. The weld schedule optimization module is further configured to iv) compare the total amount of required electrical current to a maximum current threshold, and v) when the total amount of required electrical current exceeds the maximum current threshold, generate a modified weld schedule by modifying one or more of the weld sequences such that at least one of the weld events defined in the one weld sequence is scheduled for a later time point in the weld schedule. The weld control module receives the modified weld schedule and controls the N welding apparatuses according to the modified weld schedule.

In another aspect of the disclosure, a method for optimizing a weld schedule that is used to control N welding apparatuses comprises receiving the weld schedule from a weld schedule source, the weld schedule defining N different weld sequences, each weld sequence defining one or more weld events to be performed by a corresponding welding apparatus of the N welding apparatuses, each one of the weld events defining a weld operation and a duration of the weld operation. The method further comprises for each one of the weld events, determining an amount of electrical current required to perform the weld operation defined by the one weld event. The method also includes determining, at a time point in the weld schedule, a total amount of electrical current required by the N welding apparatuses based on the amounts of electrical current required by the weld events that are scheduled to be performed at the time point, and comparing the total amount of required electrical current to a maximum current threshold. When the total amount of required electrical current exceeds the maximum current threshold, the method further includes generating a modified weld schedule by modifying one or more of the weld sequences such that at least one of the weld events defined in the one weld sequence is scheduled for a later time point in the weld schedule. The method further comprises controlling the N welding apparatuses in accordance with the modified weld schedule.

In another aspect of the disclosure, a system for optimizing a weld schedule is disclosed. The system includes N welding apparatuses configured to perform welding operations, where N is an integer greater than 1. The system further includes a weld schedule optimization module that is configured to receive the weld schedule from a weld schedule source, the weld schedule defining N different weld sequences, each weld sequence defining one or more weld events to be performed by a corresponding welding apparatus of the N welding apparatuses, each one of the weld events defining at least one operation including a weld operation, each weld event further defining a duration of the at least one operation. The weld schedule optimization module is further configured to identify one or more variable current weld events from the one or more weld events, a variable current weld event defining more than one operation, each operation having a corresponding current requirement. The weld schedule optimization module is further configured to identify one or more fixed current weld events from the one or more weld events, a fixed current weld event having a fixed electrical current requirement. The weld schedule optimization module is further configured to separate each one of the variable current weld events into a plurality of segments based on the operations defined in the one variable current weld event, each segment corresponding to a different operation defined in the one variable weld event. The weld schedule optimization module is further configured to, for each one of the weld events, determine an amount of electrical current required to perform each operation defined in the event and to determine, at a time point in the weld schedule, a total amount of electrical current required by the N welding apparatuses based on the amounts of electrical current required by the operations that are scheduled to be performed at the time point. The weld schedule optimization module is further configured to compare the total amount of electrical current to a maximum current threshold. The weld schedule optimization module is further configured to, when the total amount of electrical current exceeds the maximum current threshold, generate a modified weld schedule by modifying one or more of the weld sequences such that at least one of the weld events defined in the one weld sequence is scheduled for a later time point in the weld schedule. The system further comprises a weld control module that is configured to receive the modified weld schedule and controls the N welding apparatuses according to the modified weld schedule.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIGS. 3A-3C are charts illustrating a weld schedule being optimized to resolve weld event scheduling conflicts.

DETAILED DESCRIPTION

Figure 1:
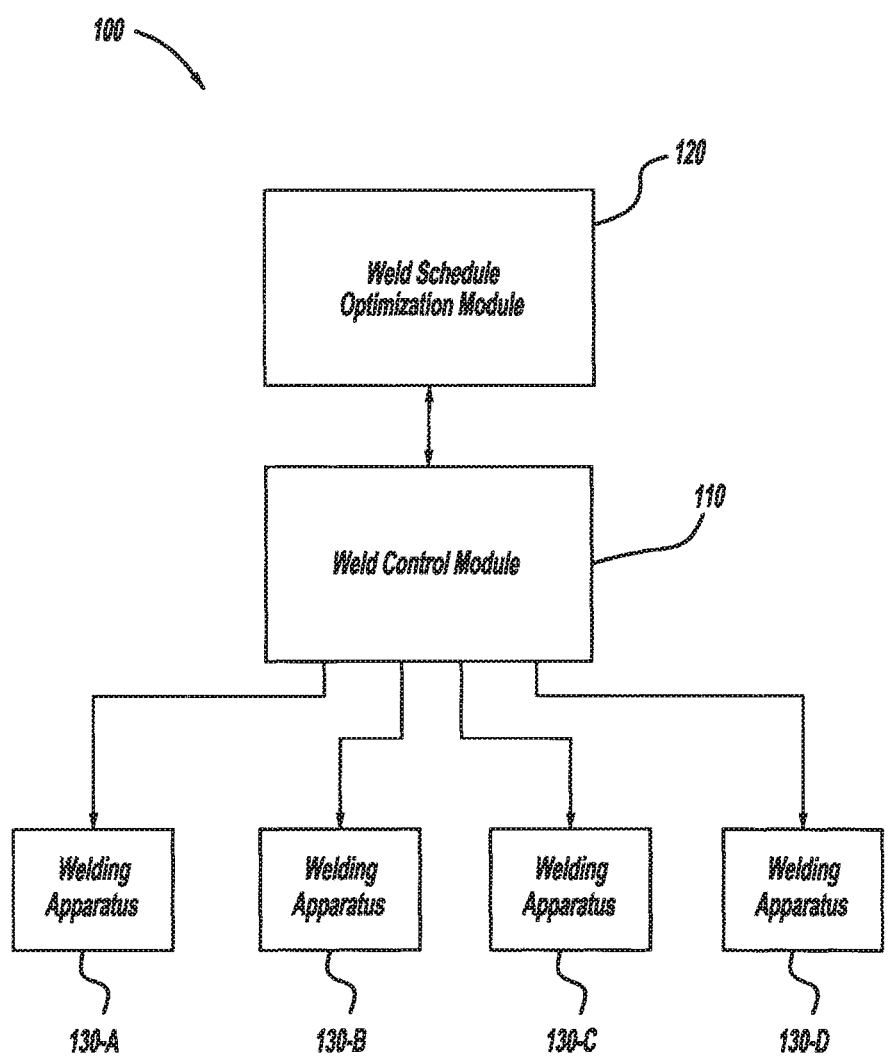
FIG. 1 is a component diagram illustrating example components of a welding system.

Referring to FIG. 1, an example welding system 100 is disclosed. In some embodiments, the welding system 100 includes a weld control module 110, a weld schedule optimization module 120, and a plurality of welding apparatuses 130. In the illustrated example, there are four welding apparatuses, e.g., welding apparatus 130-A, welding apparatus 130-B, welding apparatus 130-C, and welding apparatus 130-D, collectively referred to as welding apparatuses 130. It is appreciated that the welding system 100 may include up to N welding apparatuses 130, where N is an integer greater than 1. It should be appreciated that in the illustrative example, the welding system 100 is a robotic welding system that controls the motions of the N welding apparatuses 130 that draw current from a common power supply (not shown).

In the illustrative example, the weld control module 110 is configured to control the N welding apparatuses 130 partly based on a weld schedule. The weld schedule defines a plurality of different weld sequences that are to be performed by the welding apparatuses 130. Each weld sequence corresponds to one of the welding apparatuses 130. Each of the weld sequences defines one or more weld events.

In an exemplary embodiment, a weld event defines one or more operations that are to be performed by the corresponding welding apparatus 130, including a weld operation. The weld operation may define a starting location of the weld operation, an ending location of the weld operation, and a duration of the weld operation. For instance, a first example weld event may define that a small gauge weld is to be performed at a particular location, i.e., starts and ends at the same location, and is to be performed for two seconds. The first weld event may also define the amount of instantaneous current that is required to perform the small gauge weld, e.g., 3,000 amps. Similarly, a second weld event may define that a seam weld is to be performed on more than one work piece, starting at a starting location, $L_O$ and ending at an ending location, $L_{End}$, over a duration of four seconds. The second weld event may require a required amount of current that is greater than would be required for the small gauge weld. For example, a larger gauge weld may require 12,000 amps. It should be appreciated that some weld events may require variable current draws. For example, a weld event of a particular weld operation may have a first current requirement for a first period of time, e.g., 5,000 amps for a heat-up period, a second current requirement for a second period of time, e.g., 12,000 amps for a welding period, and a third current requirement for a third period of time, e.g., 3,000 amps for a cool-down period. It should be appreciated that a weld event can define other operations, such as a heat-up operation and a cool-down operation, discussed further below.

In an exemplary embodiment, the weld control module 110 receives the weld schedule from the weld schedule optimization module 120 and controls the plurality of welding apparatuses 130 in accordance with the weld schedule. In some situations, the weld schedule may have two or more weld events scheduled at a particular time. In these scenarios, the aggregate amount of instantaneous current draw at the particular time may exceed an amount of instantaneous current that a manufacturing facility may be able to provide to the welding system 100. As will be described in further detail below, such scenarios may be referred to as a conflict in the weld schedule.

In an exemplary embodiment, the weld schedule optimization module 120 is configured to receive a weld schedule from a weld schedule source. It should be appreciated that the weld schedule optimization module 120 may receive the weld schedule from any suitable weld schedule source, e.g., uploaded by a human user or entered via a user interface (not shown). In the exemplary embodiment, the weld schedule optimization module 120 is further configured to determine whether, at any given time during the weld schedule, the total amount of instantaneous current required at the given time for the scheduled weld operations. If the total amount of instantaneous current exceeds a predetermined threshold, e.g., 2,0000 amps, the weld schedule optimization module 120 generates a modified weld schedule. In an exemplary embodiment, the weld schedule optimization module 120 is configured to iteratively increment through the weld schedule to determine all time points in the welding schedule that cause a conflict. A time point in a schedule corresponds to a particular point in time with respect to the weld schedule. For instance, the weld schedule optimization module 120 can increment to time points in the weld schedule corresponding to the commencement of each of the weld events, or in the case of a weld event having a variable current draw, to each time point in the weld event where the current is changed or a new operation is defined. A time point in the weld schedule is said to have a conflict when the weld events being performed at the time point demand an aggregate amount of instantaneous current that is greater than a maximum current threshold. It is appreciated that the maximum current threshold may be unique to different welding systems 100 and manufacturing facility, and may be determined by an operator or local regulatory authority. Furthermore, within a manufacturing facility different welding systems 100 may have different maximum current thresholds associated therewith.

In some embodiments, when a conflict in the weld schedule is identified, the weld schedule optimization module 120 reschedules one or more of the weld events to begin at a later time point in the weld schedule. Once a particular conflict has been resolved, the weld schedule optimization module 120 can identify a next conflict in the weld schedule, and repeat the foregoing. It is appreciated that the weld schedule optimization module 120 iteratively increments through the weld schedule until all of the conflicts are resolved. Furthermore, in some embodiments, the weld schedule optimization module 120 can be configured to reschedule weld events to an earlier time point in the weld schedule, if such a rescheduling would not create another conflict and would not require a disruption of the weld sequence of the corresponding welding apparatus 130.

In some embodiments, the weld schedule optimization module 120 further receives a priority list or a priority vector, defining priorities of each of the weld events identified in the weld schedule. Each weld event may have unique priority value associated therewith. The priority value of each weld event can be utilized by the weld schedule optimization module 120 to determine which of the weld events that are scheduled to be performed at a same time point to reschedule. For example, in some embodiments, of the weld events scheduled for a same time point in the schedule, the weld event having the lowest priority is rescheduled should a conflict be determined at the particular time point. It is noted that the priority list can be determined based on various factors. For instance, weld events performed at an older welding apparatus 130 may have a lower priority so that the older weld apparatus is not overly used during the weld process and to allow longer cool-down periods between weld operations, which may extend the life of a welding apparatus.

It is appreciated that the weld schedule optimization module 120 can be further configured to ensure certain requirements are met. For instance, the weld schedule optimization module 120 may receive a maximum time threshold. If the amount of time required to complete the modified weld schedule exceeds the maximum time threshold, the weld schedule optimization module 120 may be configured to rearrange the priority list and generate a new modified schedule. Such rearranging of the priorities would, however, need to maintain the ordering of the weld sequences.

Figure 2:
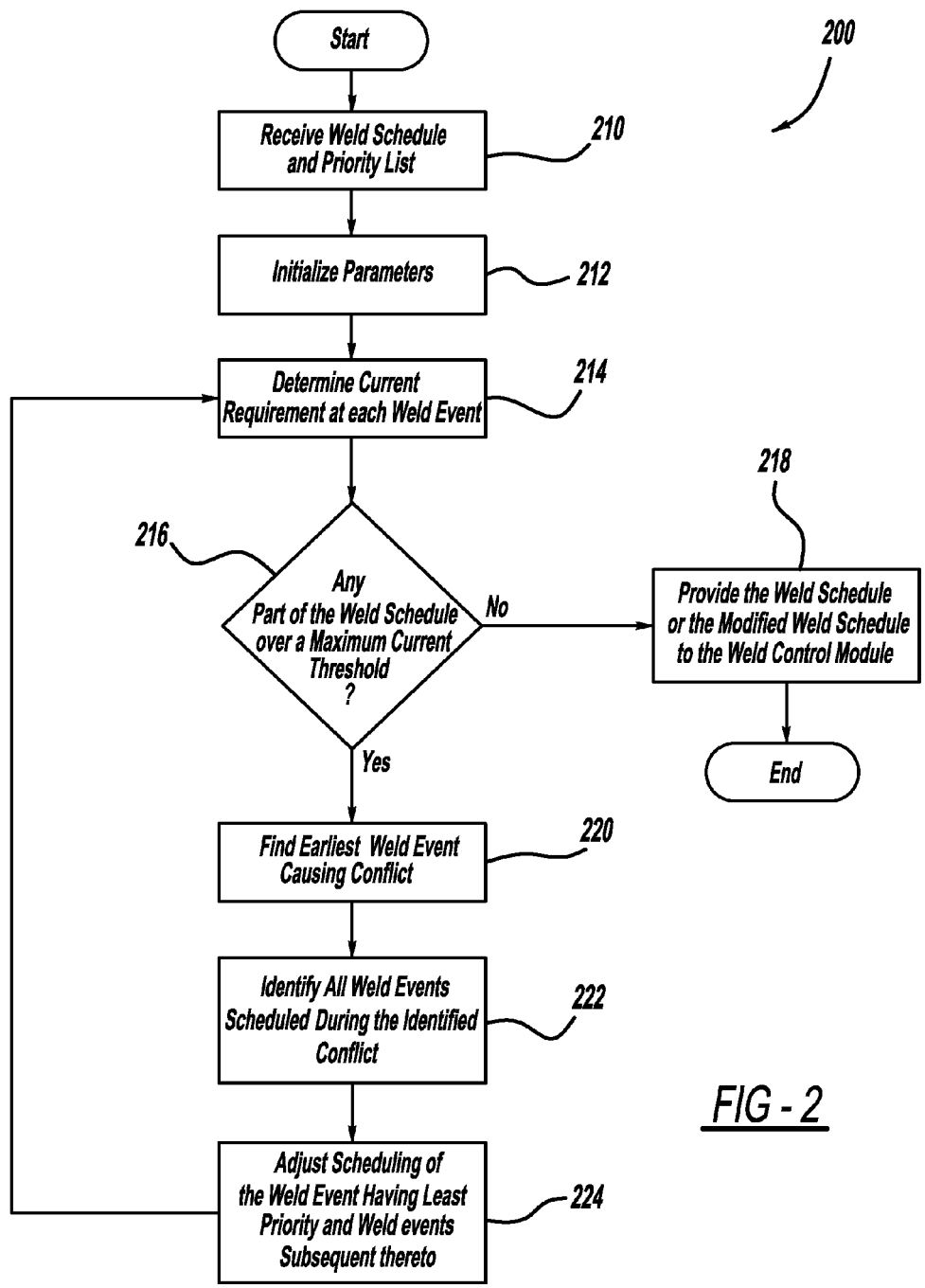
FIG. 2 is a flow chart illustrating an example method for generating an optimized weld schedule.

FIG. 2 illustrates an example method 200 for optimizing a weld schedule that is used to control a plurality of welding apparatuses. At step 210, the weld schedule optimization module 120 receives a weld schedule and a priority list from a weld schedule source, e.g., a human operator. As described above, the weld schedule defines a plurality of different weld sequences, and each of the weld sequences define one or more weld events to be performed in succession. The priority list defines priorities of each weld event in relation to the other scheduled weld events. At step 212, the weld schedule optimization module 120 can initialize parameters such as a maximum current threshold. For instance, the weld schedule optimization module 120 can receive the maximum current threshold from the weld control module 110 such that the maximum current threshold can be varied during different times or days. The weld schedule optimization module 120 can then determine an instantaneous current demand for each of the scheduled weld events. As described above, the current demand can be determined from the received weld schedule.

In the illustrative example, the weld schedule optimization module 120 then determines if there are any time points in the welding schedule where the aggregate current requirement exceeds the maximum current threshold, as shown at step 216. For purposes of explanation, when a plurality of weld events are performed at a same time point and require an aggregate amount of current that exceeds the maximum current threshold, the time point is said to have a conflict. To determine whether there are any conflicts, the weld schedule optimization module 120 can start at a time point corresponding to the earliest weld event in the welding schedule and determine the current demands of all of the weld events that are scheduled at the time point.

It should be appreciated that a weld event can require a variable current draw, e.g., a ramp-up current, a weld current, and a ramp-down current. For example, a weld event may define more than one operation, such that the operations have different current requirements, e.g., 5,000 amps for an initial heat-up operation (the ramp-up current), 12,000 amps during the welding operation is performed (the weld current), and 3,000 amps for a cool-down operation (the ramp-down current). In some embodiments, the weld schedule optimization module 120 can handle a weld event having a variable current requirement by using the maximum current requirement of the weld event as the required current requirement of the weld event at the time point being analyzed and for the duration of the weld event. In the example provided above, the weld schedule optimization module 120 would use the 12,000 amp current requirement as the current requirement for the entire weld event. In other embodiments, the weld schedule optimization module 120 can separate a weld event requiring a variable current draw into a plurality of segments based on the different current requirements. Further, the weld schedule optimization module 120 can assign the same priority to each of the segments. In the provided example, the weld schedule optimization module 120 can separate the weld event into three segments. The first segment corresponds to the heat-up operation and has a current requirement of 5,000 amps, the second segment corresponds to the weld operation and has a current requirement of 12,000 amps, and the third segment corresponds to the cool-down operation and has a current requirement of 5,000 amps.

In the illustrative example, the weld schedule optimization module 120 aggregates the current requirements of all of the weld events scheduled at the time point and compare the aggregated instantaneous current requirement to the maximum current threshold. If the aggregated current requirement exceeds the maximum current threshold, then the welding schedule is determined to have a conflict. If the aggregated current requirement does not exceed the maximum current threshold, then the weld schedule optimization module 120 iterates to the next time point and executes the same technique. In some embodiments, the next time point is when the next scheduled weld event is scheduled to commence, or in the case that the higher priority weld event has a variable current draw, at the time point where the current draw of the weld event having the variable current draw is decreased. The weld schedule optimization module 120 can continue in this manner until one or more conflicts are identified, or until the entire schedule is analyzed and is determined to contain no conflicts. If there are no conflicts or if all of the conflicts are resolved, then the weld schedule or modified weld schedule are provided to the weld control module 110, as shown at step 218.

If one or more conflicts are identified in the weld schedule, the weld schedule optimization module 120 identifies the time point of the earliest conflict in the weld schedule, as shown at step 220. At the time point of the identified conflict, the weld events that are scheduled to be performed at the time point of the conflict are identified, as shown at step 222. Of the identified weld events scheduled to be performed during the time point of the conflict, the weld event having the lowest priority is rescheduled. As described above, the lowest priority weld event can be rescheduled for a later time point, such that the conflict is resolved.

Once a conflict is resolved, the weld schedule optimization module 120 iterates back to step 214 to determine whether more conflicts are found in the welding schedule. It is appreciated that the weld schedule optimization module 120 can continue to iterate until all of the conflicts in the welding schedule are resolved. It is further appreciated that as weld events are scheduled, new conflicts may arise. As the weld schedule optimization module 120 continues to iterate, however, the new conflicts can also be resolved. Once all the conflicts are resolved, the weld schedule optimization module 120 can provide the modified weld schedule to the weld control module 110, as shown at step 218.

It is appreciated that the foregoing is an example method is provided for example only. Variations of the method are considered and within the scope of the disclosure.

Figure 3A:
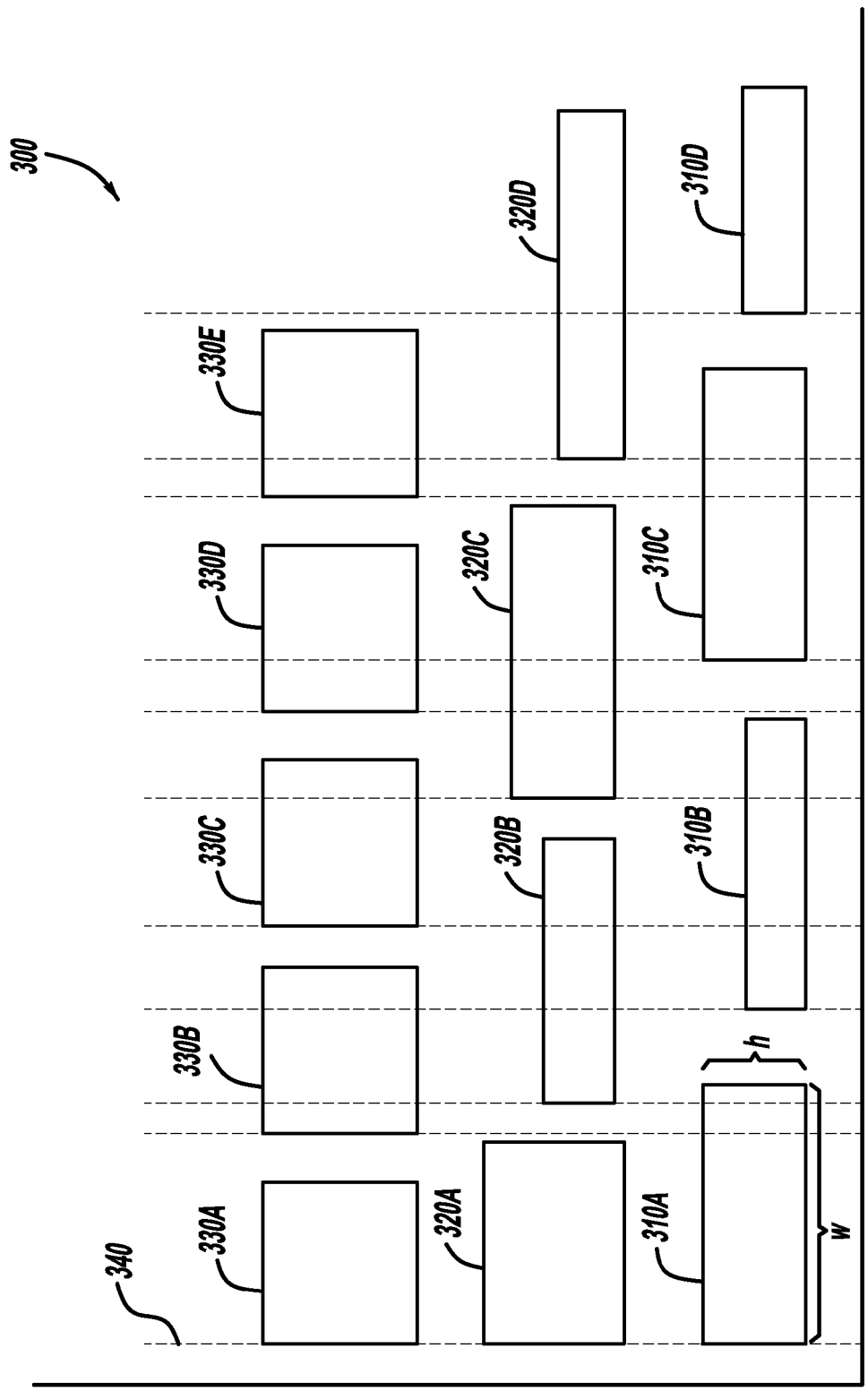
Figure 3B:
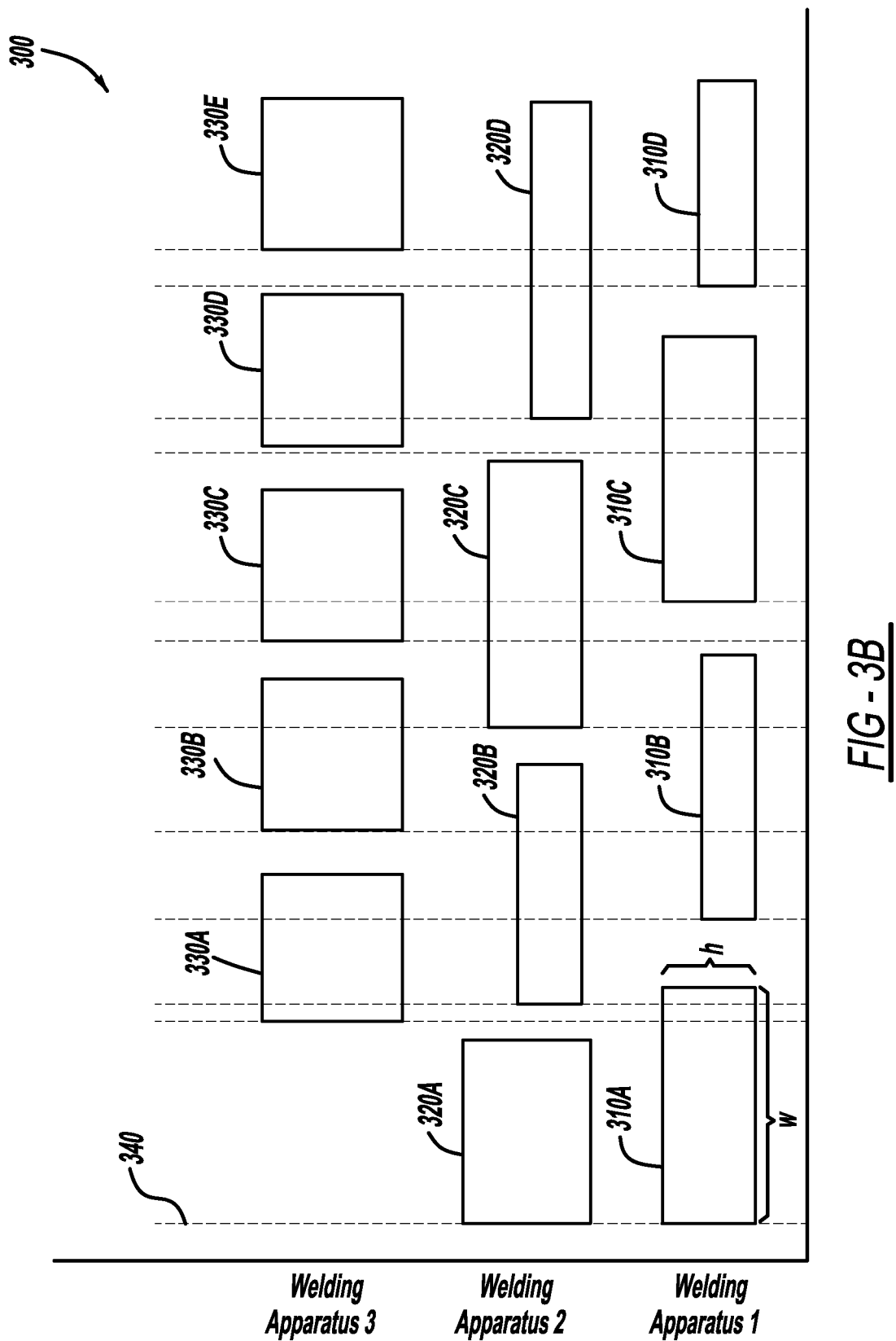

FIGS. 3A-3C illustrate an example of a weld schedule 300 being modified. In the example, three welding apparatuses are to perform weld operations. The first welding apparatus is to perform a weld sequence including weld event 310A, weld event 310B, weld event 310C, and weld event 310D. The second welding apparatus is to perform a weld sequence including weld event 320A, weld event 320B, weld event 320C, and weld event 320D. The third welding apparatus is to perform a weld sequence including weld event 330A, weld event 330B, weld event 330C, and weld event 330D. In the example, the width, w, of a box, e.g., weld event 310A, indicates a relative duration of the welding operation to be performed, and the height, h, of the box indicates a relative instantaneous current requirement. The dashed lines indicate a time point. For example, line 340 indicates the start of weld event 310A, weld event 320A, and weld event 330A.

As discussed above, the weld schedule optimization module 120 identifies conflicts in the welding schedule. For example, the amount of current required by weld event 310A, weld event 320A, and weld event 330A may exceed the maximum current threshold. Once identified as a conflict, the weld schedule optimization module 120 can shift the weld event having the least priority to a later time point, such that the weld event commences at a later time in the schedule. For instance, if weld event 330A has the least priority, weld event 330A can be shifted to a later time point, as well as all subsequent weld events in weld event 330A's sequence, e.g., weld event 330B, weld event 330C, and weld event 330D.

FIG. 3B illustrates the weld schedule after weld event 330A and the subsequent weld events have been shifted. As a result of the rescheduling of the subsequent weld events in the third weld sequence, a conflict may arise from the scheduling of weld event 330C, weld event 320C, and weld event 310C. In the example, weld event 310C may have the lowest priority. Thus, weld event 310C may be shifted, as well as weld event 310D.

FIG. 3C illustrates a modified weld schedule after weld event 310C and 310D have been shifted. In this example, the weld schedule optimization module 120 may determine that there are no more remaining conflicts. The weld schedule optimization module 120 can then communicate the weld schedule to the weld control module 110, which in turn controls the welding apparatuses 130.

It is appreciated that the foregoing was provided for example only. It is appreciated that the foregoing example could have included any number of welding apparatuses and weld events.

Referring now to Appendix A, example computer code written for a MATLAB® compiler by MathWorks, Inc. is provided. The example provided provides a method for optimizing a weld schedule where the weld events have fixed current requirements. The foregoing is provided for example only and is not intended to be limiting.

FIGS. 4A-4E illustrate examples of a weld schedule 400 containing a weld event 410 having a variable current draw being modified according to some embodiments of the present disclosure. In the illustrated example, weld event 410 is performed by welding apparatus 1 and has three different current requirements. As should be appreciated, the current requirements may correspond to a heat-up operation requiring a ramp-up current, a welding operation requiring a weld current, and a cool-down operation requiring a ramp-down current. For the purposes of explaining FIGS. 4A-4E, the ramp-up current for weld event 410 is 4,000 amps, the weld current of weld event 410 is 8,000 amps, and the ramp-down current for weld event 410 is 2,500 amps. Further, weld event 410 is performed by welding apparatus 2 and has a fixed current requirement of 8,000 amps.

Figure 4A:
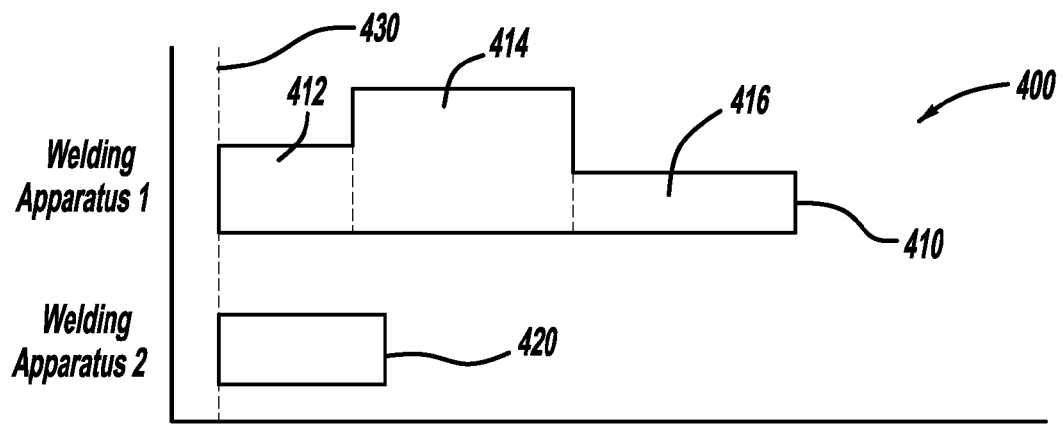
FIGS. 4A-4E are charts illustrating a weld schedule being optimized to resolve weld event schedule conflicts where one weld event has a variable current draw.

FIG. 4A illustrates an example of the weld schedule, as received by the weld schedule optimization module 120. In the illustrated example, both weld event 410 and weld event 420 are scheduled to begin at time point 430. The weld schedule optimization module 120 can identify weld event 410 as a variable current weld event, i.e., weld event 410 defines more than one operation requiring a different current draw. Thus, the weld schedule optimization module 120 can separate weld event 410 into three segments: segment 412, segment 414, and segment 416. As will be described in the examples provided below, the weld schedule optimization module 120 can determine the current requirements at different time points corresponding to each of the segments to determine whether to modify the weld schedule. As described above, the weld schedule optimization module 120 can determine how to modify the schedule based on the current requirements of weld events 410 and 420 as well as the priority assigned to the weld events 410 and 420.

Figure 4B:
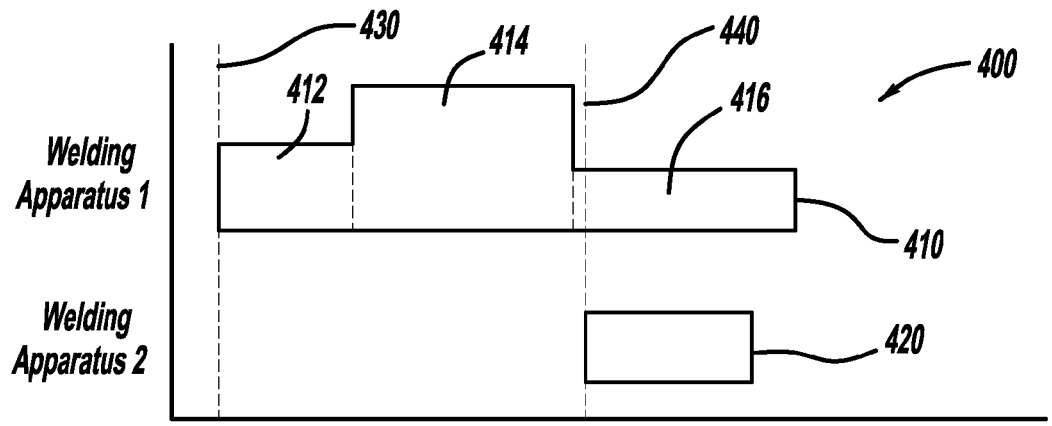

In the example of FIG. 4B, weld event 410 has a higher priority than weld event 420. Further, in the example, the maximum current threshold is 11,000 amps. In this example, the weld schedule optimization module 120 has determined that at time point 430, the amount of current required by weld event 420 and segment 412 of weld event 410 would exceed the maximum current threshold. Furthermore, the amount of current that would be required if weld event 420 was performed during segment 414 would also exceed the maximum current threshold. The amount of current that would be required to perform weld event 420 during segment 416, however, would be 10,500 amps, which is below the maximum current threshold. Thus, the weld schedule optimization module 120 has adjusted the scheduling of weld event 420 such that it begins at or after time point 440.

Figure 4C:
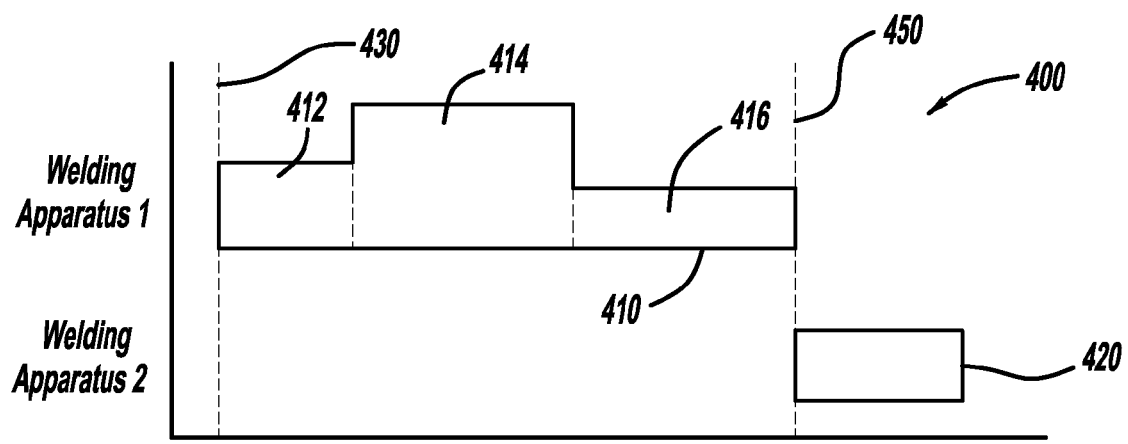

In the example of FIG. 4C, weld event 410 has a higher priority than weld event 420 and the maximum current threshold is 9,000 amps. In this example, the weld schedule optimization module 120 has determined that at time point 430, the amount of current required by weld event 420 and segment 412 of weld event 410 would exceed the maximum current threshold. Furthermore, the weld schedule optimization module 120 has determined that the amount of current that would be required to perform weld event 420 while either segment 414 or segment 416 were being performed would also exceed the maximum current threshold. Thus, the weld schedule optimization module 120 has adjusted the scheduling of weld event 420 such that it begins at or after time point 450, such that weld event 420 begins only after weld event 410 has been completed.

Figure 4D:
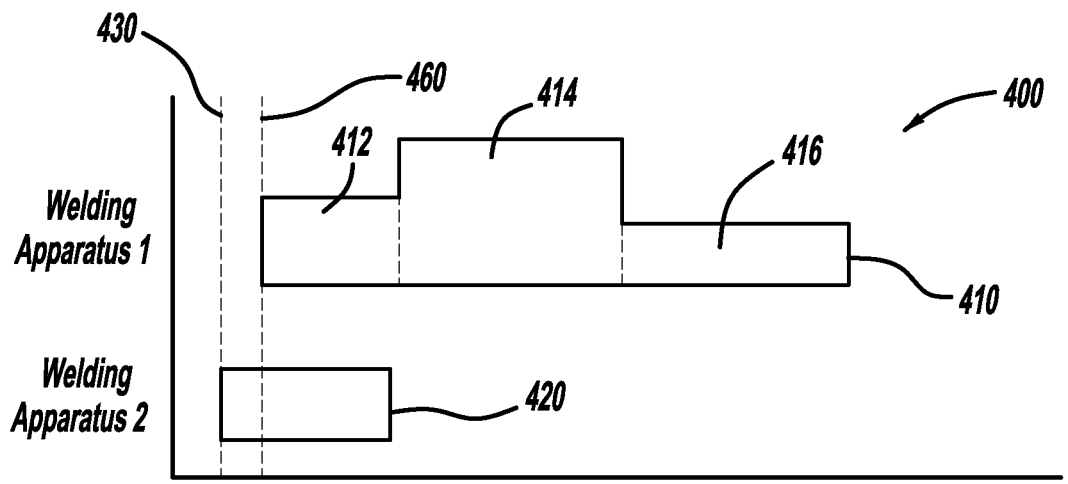

In the example of FIG. 4D, weld event 420 has a higher priority than weld event 410 and the maximum current threshold is 14,000 amps. In the example of FIG. 4D, the weld schedule optimization module 120 has determined that at time point 430, the amount of current required by weld event 420 and segment 412 does not exceed the maximum current threshold. The weld schedule optimization module 120 has further determined that when segment 414 begins, the amount of current required by weld event 420 and segment 414, e.g., 16,000 amps, would exceed the maximum current threshold. Thus, the weld schedule optimization module 120 has adjusted the scheduling of weld event 410 such that segment 412 begins at or after time point 460, such that segment 414 begins only after weld event 420 has been completed.

Figure 4E:
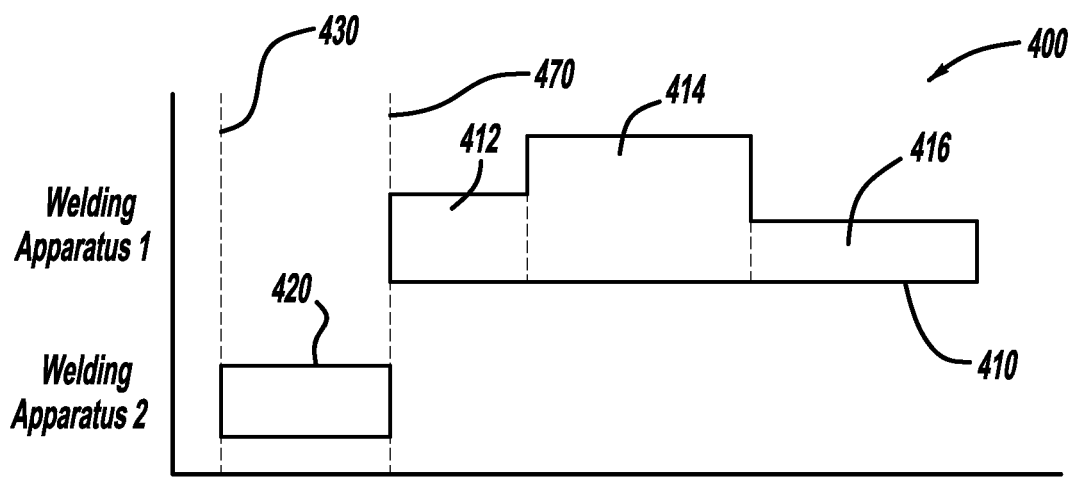

In the example of FIG. 4E, weld event 420 has a higher priority than weld event 410 and the maximum current threshold is 9,000 amps. In this example, the weld schedule optimization module 120 has determined that a conflict exists at time point 430, as the amount of current required by weld event 420 and segment 412 exceeds the maximum current threshold. As weld event 420 has priority over weld event 410, weld event 410 is rescheduled to begin at or after time point 470, so as to begin after weld event 420 has been completed.

It is appreciated that the foregoing was provided for example only. It is appreciated that the foregoing example could have included any number of welding apparatuses and weld events.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, bytecode and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The description of the invention is merely exemplary in nature and, thus, variations that do not depart from the gist of the invention are intended to be within the scope of the invention. Such variations are not to be regarded as a departure from the spirit and scope of the invention.

APPENDIX A

```
% ********** ITEM #01 **********
% START with a given schedule
Welder_Num = [1 2 3 4 5 6]; % welder identifier
Welder_Amp = [1 2 3 4 5 7]; % current drawn by corresponding welder
Welder_Dur = [6 5 4 3 2 4]; % time length of weld by corresponding welder
% Determine which welder has higher priority to stay
% The lower the number, the more likely to be moved
% Each priority is a unique number.
% This example: electrical current draw (amp) is more important than time
for ii=1:max(size(Welder_Num))
    Welder_Priority(ii) = Welder_Dur(ii) + Welder_Amp(ii)^2;
end
Max_Amp = 9; % maximum allowed amps based on environment
Event_Mat = [1,1; % welder number then time start
    1,8; % column then row
    2,4;
    3,1;
    3,9;
    4,4;
    4,8;
    5,3;
    5,6;
    5,9;
    5,12
    6,2
    6,7];
% create full weld schedule
for ii=1:max(size(Event_Mat))
    w_n=Event_Mat(ii,1); % get welder number
    s_t=Event_Mat(ii,2); % get start time
    for jj=1:Welder_Dur(w_n)
        Event_Sched_Init(s_t-1+jj,w_n) = Welder_Amp(w_n);
    end
end
% ********** ITEM #02 **********
% initialize paramenters, calculate demand at each event (amps)
% create maximum amps per event
for ii=1:max(size(Event_Sched_Init))
    Max_Amps_Init(ii,1)=sum(Event_Sched_Init(ii,:));
end
%
% copy original schedules INITS KEPT FOR DEBUGGING PURPOSES ONLY
Max_Amps=Max_Amps_Init;
Event_Sched=Event_Sched_Init;
ii=2; % increment along event axis assume initial event not over the limit
%
% DEBUGGING VARIABLES ONLY THEY DO NOT AFFECT PROGRAM FLOW
addr = 1; % welder address to track how schedule modified
safe = 0; % prevent infinite loop and track number of event evaluations
% ********** ITEM #03 **********
% any part of schedule over amp limit
while (max(Max_Amps)>Max_Amp) & (safe < 1000)
    safe = safe+1;
    if (ii <= 2) % assume first overamp not at start of schedule
        Welder_Start = Welder_Num*0;
    end
    % find first instance of over amp limit
    % ********** ITEM #05 **********
    % This event over the limit
    if (Max_Amps(ii) > Max_Amp) % no need for Welder_Start == 0
        % find which welders started at this event
        % ********** ITEM #06 **********
        % increment to next welder and have all welders been checked
        for jj = 1:max(size(Welder_Num))
            % ********** ITEM #07 **********
            % this welder just started
            if ((Event_Sched(ii-1,jj) == 0) & (Event_Sched(ii,jj) > 0))
                % ********** ITEM #08 **********
                % identify welder store address
                Welder_Start(1,jj) = ii; % include event time
                Start_Addr = ii;
            end
        end
        % finish clean-up of which welder's schedule is delayed
        Weld_Start_Min = max(Welder_Priority)+1; % initialize search
        % ********** ITEM #09 **********
```

APPENDIX A-continued

```
% incement across identified welders & use priority list
for jj= 1:max(size(Welder_Num)) % select relevant priorities
        if (Welder_Priority(jj) < Weld_Start_Min) &
        (Welder_Start(jj) >0)
                Weld_Start_Min = Welder_Priority(jj);
        end
    end
    for jj = 1:max(size(Welder_Num))
        % of welders starting at this event, select one to delay
        % ********** ITEM #10 **********
        % is this the lowest priority welder
        if (Welder_Priority(jj) > Weld_Start_Min) &
        (Welder_Start(jj) > 0)
                Welder_Start(jj)=0;
        end
        % Extract which Welder schedule to shift
        if (Welder_Start(jj) >0)
                Welder_Addr = jj;
                Addr_Track(addr) = jj;
                addr = addr + 1;
        end
    end
    % fully identified which welder and when to begin schedule shift
    % ********** ITEM #11 **********
    % shift lowest priority welder schedule down (later) by one
    event
    Sched_Length = max(size(Event_Sched));
    for jj = 0:Sched_Length-Start_Addr+1
        Event_Sched(Sched_Length-jj+1,Welder_Addr) =...
            Event_Sched(Sched_Length-jj,Welder_Addr);
    end
    % create maximum amps per event
    for jj=1:max(size(Event_Sched))
        Max_Amps(jj,1)=sum(Event_Sched(jj,:));
    end
end
% ********** ITEM #04 **********
% increment down schedule
if (max(Welder_Start) == 0) % continue search, high current not
detected
        ii=ii+1;
else
        ii=2; % reinitiate search
end
end
% ********** ITEM #03 **********
% NO PART OF SCHEDULE OVER AMP LIMIT
%
% THIS IS CLEANUP OF DATA AND NOT PART OF THE
DISCLOSURE
%trim off excess of event Event_Sched and recalculate Max_Amps
ii = max(size(Max_Amps));
while (max(sum(Event_Sched(ii,:))) == 0)
    temp = Event_Sched([1:ii-1],:);
    Event_Sched = temp;
    ii=ii-1;
end
% THIS IS LAST RECALCULATION OF ELECTRICAL AMP DRAW
AT EACH EVENT
% create final amps per event
Max_Amps = [ ];
for ii=1:max(size(Event_Sched))
    Max_Amps(ii,1)=sum(Event_Sched(ii,:));
end
```

What is claimed is:

1. A system for optimizing a weld schedule comprising:
N welding apparatuses configured to perform welding operations, where N is an integer greater than 1;
a weld schedule optimization module that is configured to:
i) receive the weld schedule from a weld schedule source, the weld schedule defining N different weld sequences, each weld sequence defining one or more weld events to be performed by a corresponding welding apparatus of the N welding apparatuses, each one of the weld events defining a weld operation and a duration of the weld operation,
ii) for each one of the weld events, determine an amount of electrical current required to perform the weld operation defined by the one weld event;
iii) determine, at a time point in the weld schedule, a total amount of electrical current required by the N welding apparatuses based on the amounts of electrical current required by the weld events that are scheduled to be performed at the time point, and
iv) compare the total amount of electrical current to a maximum current threshold, and
v) when the total amount of electrical current exceeds the maximum current threshold, generate a modified weld schedule by modifying one or more of the weld sequences such that at least one of the weld events defined in the one weld sequence is scheduled for a later time point in the weld schedule to re-order the weld events in the weld schedule; and
a weld control module that is configured to receive the modified weld schedule and controls the N welding apparatuses according to the modified weld schedule.

2. The system of claim 1, wherein each one of the weld events has a priority associated therewith.

3. The system of claim 2, wherein when two or more weld events are scheduled to be performed at a same time point, and a total amount of current required at the same time point exceeds the maximum current threshold, the weld schedule optimization module reschedules a specific weld event of the two or more weld events having a lowest priority for a subsequent time point.

4. The system of claim 3, wherein the specific weld event is rescheduled only if the total amount of current required at the same time is reduced below the maximum current threshold.

5. The system of claim 3, wherein the weld schedule optimization module is further configured to reschedule any weld events in the weld sequence of the specific weld event that are scheduled subsequent to the specific weld event.

6. The system of claim 5, wherein the weld schedule optimization module is further configured to determine a total amount of time required to execute the weld schedule, and compares the total amount of time to a time threshold, wherein when the total amount of time required to execute the weld schedule exceeds the time threshold, the weld schedule optimization module modifies the priorities of the weld events and generates a new modified weld schedule.

7. The system of claim 1, wherein the weld schedule optimization module is further configured to determine total amounts of electrical current required by the N welding apparatuses at a plurality of time points, wherein each time point corresponds to a commencing of one of the weld events 8. The system of claim 7, wherein the weld schedule optimization module is further configured to compare each of the total amount of electrical current required by the N welding apparatuses with the maximum current threshold.

9. The system of claim 8, wherein when any of the total amounts of electrical current exceeds the maximum current threshold, the weld schedule optimization module modifies the weld schedule such that at least one of the weld events defined in the one weld sequence is scheduled for a later time point in the weld schedule.

10. The system of claim 1, wherein the weld schedule optimization module is further configured to:
determine whether one or more of the weld events requires a variable current draw; and
separate each weld event requiring a variable current draw into a plurality of segments, each segment corresponding to an amount of current required during the segment, wherein the weld schedule optimization module analyzes each segment individually when determining whether the weld schedule is to be modified, and when the weld schedule optimization module determines that a particular segment is to be scheduled for the later time point in the weld schedule, the weld schedule optimization module schedules the weld event corresponding to the particular segment such that the particular segment commences at the later time point.

11. A method for optimizing a weld schedule that is used to control N welding apparatuses, method comprising:
receiving the weld schedule from a weld schedule source, the weld schedule defining N different weld sequences, each weld sequence defining one or more weld events to be performed by a corresponding welding apparatus of the N welding apparatuses, each one of the weld events defining a weld operation and a duration of the weld operation;
for each one of the weld events, determining an amount of electrical current required to perform the weld operation defined by the one weld event;
determining, at a time point in the weld schedule, a total amount of electrical current required by the N welding apparatuses based on the amounts of electrical current required by the weld events that are scheduled to be performed at the time point; and
comparing the total amount of electrical current to a maximum current threshold; and
when the total amount of electrical current exceeds the maximum current threshold, generating a modified weld schedule by modifying one or more of the weld sequences such that at least one of the weld events defined in the one weld sequence is scheduled for a later time point in the weld schedule to re-order the weld events in the weld schedule; and
controlling the N welding apparatuses in accordance with the modified weld schedule.

12. The method of claim 11 further comprising receiving a priority list indicating priorities of weld events with respect to other weld events defined in the weld schedule, wherein each weld event has a priority associated therewith.

13. The method of claim 12 further comprising:
when two or more weld events are scheduled to be performed during a same time point and a total amount of current required at the same time point exceeds the maximum current threshold, rescheduling a specific weld event of the two or more weld events having a lowest priority for a subsequent time point.

14. The method of claim 13, wherein the specific weld event is rescheduled only if the total amount of current required at the same time is reduced below the maximum current threshold.

15. The method of claim 13 further comprising rescheduling any weld events in the weld sequence of the specific weld event that are scheduled subsequent to the specific weld event.

16. The method of claim 15 further comprising:
determining a total amount of time required to execute the weld schedule; and
comparing the total amount of time to a time threshold.

17. The method of claim 16 further comprising:
when the total amount of time required to execute the weld schedule exceeds the time threshold, rearranging the priorities of the weld events and generating a new modified weld schedule.

18. The method of claim 11 further comprising determining total amounts of electrical current required by the N welding apparatuses at a plurality of time points, wherein each time point corresponds to a commencing of one of the weld events 19. The method of claim 18 further comprising:
comparing each of the total amount of electrical current required by the N welding apparatuses with the maximum current threshold; and
when any of the total amounts of electrical current exceeds the maximum current threshold, modifying the weld schedule such that at least one of the weld events defined in the one weld sequence is scheduled for a later time point in the weld schedule.

20. A system for optimizing a weld schedule comprising:
N welding apparatuses configured to perform welding operations, where N is an integer greater than 1;
a weld schedule optimization module that is configured to:
  i) receive the weld schedule from a weld schedule source, the weld schedule defining N different weld sequences, each weld sequence defining one or more weld events to be performed by a corresponding welding apparatus of the N welding apparatuses, each one of the weld events defining at least one operation including a weld operation, each weld event further defining a duration of the at least one operation,
  ii) identify one or more variable current weld events from the one or more weld events, a variable current weld event defining more than one operation, each operation having a corresponding current requirement;
  iii) identify one or more fixed current weld events from the one or more weld events, a fixed current weld event having a fixed electrical current requirement;
  iii) separate each one of the variable current weld events into a plurality of segments based on the operations defined in the one variable current weld event, each segment corresponding to a different operation defined in the one variable weld event;
  iv) for each one of the weld events, determine an amount of electrical current required to perform each operation defined in the event;
  v) determine, at a time point in the weld schedule, a total amount of electrical current required by the N welding apparatuses based on the amounts of electrical current required by the operations that are scheduled to be performed at the time point, and
  vi) compare the total amount of electrical current to a maximum current threshold, and
  vii) when the total amount of electrical current exceeds the maximum current threshold, generate a modified weld schedule by modifying one or more of the weld sequences such that at least one of the weld events defined in the one weld sequence is scheduled for a later time point in the weld schedule; and
a weld control module that is configured to receive the modified weld schedule and controls the N welding apparatuses according to the modified weld schedule.

* * * * *